US012725522B2

(12) United States Patent
Nunobiki

(10) Patent No.: US 12,725,522 B2
(45) Date of Patent: Sep. 1, 2026

(54) DRIVING SUPPORT APPARATUS

(71) Applicant: TOYOTA JIDOSHA KABUSHIKI KAISHA, Toyota (JP)

(72) Inventor: Eiji Nunobiki, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/822,977

(22) Filed: Sep. 3, 2024

(65) Prior Publication Data

US 2025/0140118 A1 May 1, 2025

(30) Foreign Application Priority Data

Oct. 31, 2023 (JP) ................................ 2023-186164

(51) Int. Cl.
*G08G 1/16* (2006.01)
*G01C 21/00* (2006.01)

(52) U.S. Cl.
CPC ......... *G08G 1/166* (2013.01); *G01C 21/3822* (2020.08)

(58) Field of Classification Search
CPC ............................ G08G 1/166; G01C 21/3822
See application file for complete search history.

(56) References Cited

U.S. PATENT DOCUMENTS

| | | | | |
|---|---|---|---|---|
| 8,355,851 | B2 | 1/2013 | Inoue et al. | |
| 8,370,040 | B2 | 2/2013 | Inoue et al. | |
| 8,417,430 | B2 | 4/2013 | Saeki | |
| 8,548,709 | B2 | 10/2013 | Morita | |
| 8,768,597 | B2 | 7/2014 | Kagawa | |
| 9,174,643 | B2 | 11/2015 | Aso | |
| 10,017,178 | B2 | 7/2018 | Morimoto et al. | |
| 10,118,617 | B2 | 11/2018 | Urano et al. | |
| 10,486,698 | B2 | 11/2019 | Masui et al. | |
| 2017/0278398 | A1* | 9/2017 | Kato | G08G 1/166 |
| 2019/0295419 | A1 | 9/2019 | Tosa et al. | |

FOREIGN PATENT DOCUMENTS

| | | |
|---|---|---|
| JP | 2013-134567 A | 7/2013 |
| JP | 2017-174055 A | 9/2017 |

* cited by examiner

*Primary Examiner* — Daryl C Pope
(74) *Attorney, Agent, or Firm* — Oliff PLC

(57) ABSTRACT

A driving support apparatus is configured to perform an alert to a driver of a host vehicle when there is an approaching vehicle that is located in an alert area set in a front side area or a rear side area of the host vehicle and is approaching the host vehicle. The driving support apparatus determines whether or not there is a median strip between the host vehicle and the approaching vehicle, when there is the approaching vehicle. The driving support apparatus does not perform the alert when there is the median strip between the host vehicle and the approaching vehicle.

4 Claims, 6 Drawing Sheets

DRIVING SUPPORT APPARATUS

TECHNICAL FIELD

The present disclosure relates to a driving support apparatus configured to perform an alert when there is an approaching vehicle that is located in an alert area set in a front side or a rear side of a host vehicle and is approaching the host vehicle.

BACKGROUND

Conventionally, there has been known a driving support apparatus configured to perform an alert when there is an approaching vehicle. For example, a driving support apparatus described in Patent Document 1 (hereinafter referred to as a "conventional apparatus") does not perform the alert when all of the following conditions (1) through (3) are satisfied, even if there is the approaching vehicle.

(1) A travel direction of a host vehicle after the host vehicle turns left or right coincides with a travel direction of the approaching vehicle.

(2) A road on which the approaching vehicle is traveling has multiple lanes.

(3) The approaching vehicle is traveling in a lane other than a lane closest to a position of the host vehicle.

The conventional apparatus does not perform an unnecessary alert to be able to reduce a possibility that a driver of the host vehicle is annoyed by the alert.

Patent Document 1: Japanese Patent Application Laid-Open No. 2013-134567

SUMMARY

If the driver of the host vehicle does not notice that there is the approaching vehicle or that a vehicle speed of the approaching vehicle is high, the host vehicle may enter the lane in which the approaching vehicle is traveling without entering the lane closest to the position of the host vehicle. In this case, a collision possibility that the host vehicle collides with the approaching vehicle increases. However, the conventional apparatus does not perform the alert when all of the above conditions (1) through (3) are satisfied so that the conventional apparatus may not be able to perform a necessary alert.

The present disclosure is made to address the above problem. That is, one of the objects of the present disclosure is to provide a driving support apparatus can increase a possibility of performing the necessary alert and decrease a possibility of performing the unnecessary alert.

A driving support apparatus (10) according to the present disclosure (hereinafter, referred to as the "present disclosure apparatus") is configured to perform an alert to a driver of a host vehicle (VA) (step 340) when there is an approaching vehicle (VB) that is located in an alert area (LA, RA) set in a front side area or a rear side area of the host vehicle and is approaching the host vehicle ("Yes" at step 310).

The driving support is configured to:

determine whether or not there is a median strip (MS) between the host vehicle and the approaching vehicle (step 335), when there is the approaching vehicle ("Yes" at step 310); and perform no alert when there is the median strip between the host vehicle and the approaching vehicle ("Yes" at step 335).

When there is the median strip between the host vehicle and the approaching vehicle, a possibility that the approaching vehicle gets over the median strip to enter an area of the host vehicle side is extremely low, and a possibility that the host vehicle gets over the median strip to enter an area of the approaching vehicle side is extremely low. On the other hand, when there is no median strip between the host vehicle and the approaching vehicle, if the driver of the host vehicle does not notice the approaching vehicle, the host vehicle may enter an area of the approaching vehicle side. In this case, the vehicle may collide with the approaching vehicle. According to the present disclosure apparatus, the alert is not performed when there is the median strip between the host vehicle and the approaching vehicle, and the alert is performed when there is there is no median strip between the host vehicle and the approaching vehicle. The present disclosure apparatus can increase a possibility of performing a necessary alert and decrease a possibility of performing an unnecessary alert.

DETAILED DESCRIPTION

Figure 1:
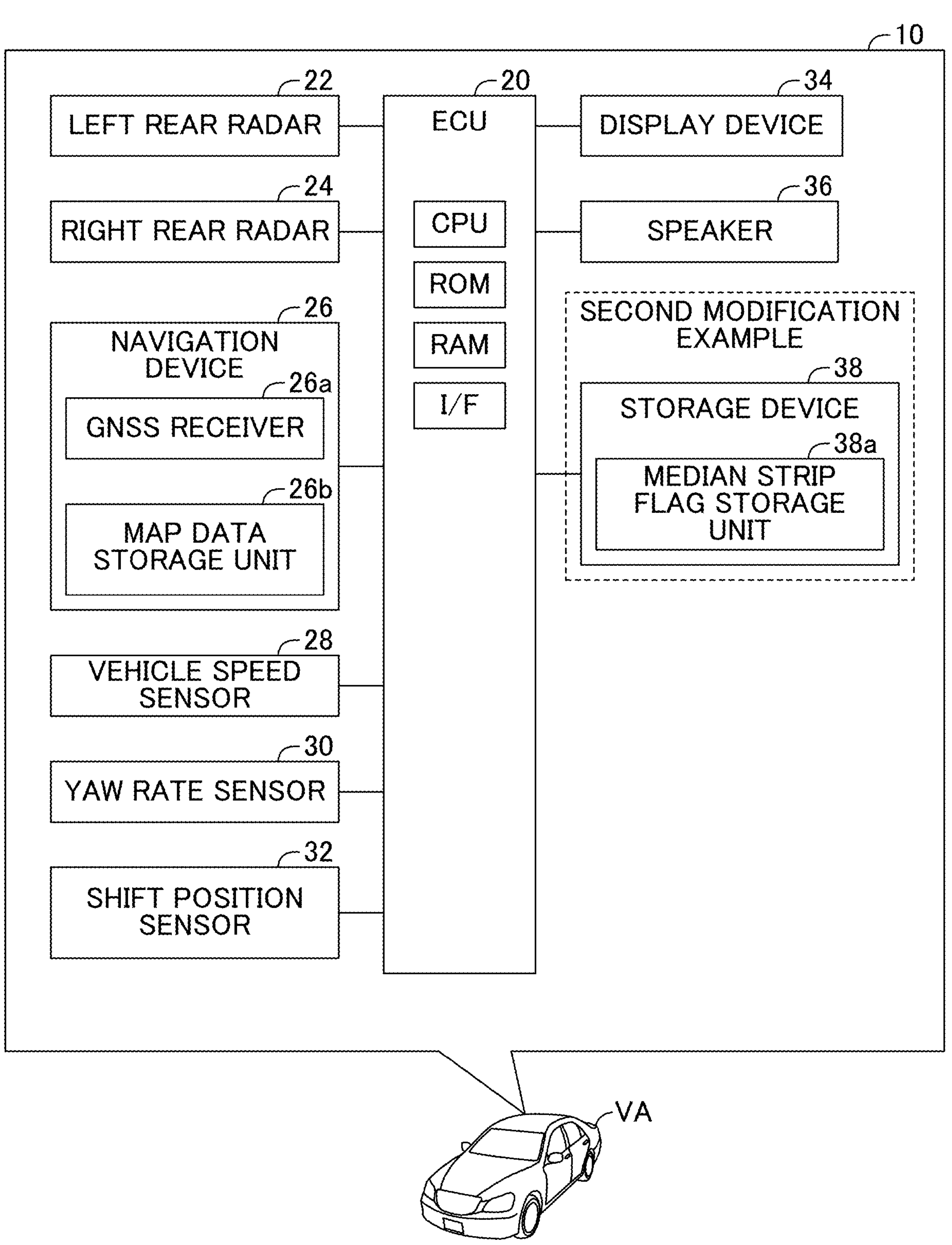
FIG. 1 is a schematic system configuration diagram of a driving support apparatus according to an embodiment of the present disclosure.

As shown in FIG. 1, a driving support apparatus 10 (hereinafter referred to as "the present apparatus 10") is applied to a host vehicle VA. The present apparatus 10 comprises components shown in FIG. 1.

When there is an approaching vehicle which is approaching the host vehicle in a left rear area or a right rear area of the host vehicle VA, an ECU 20 performs an alert for informing a driver of the host vehicle VA that the approaching vehicle VB is approaching the host vehicle VA. Such an alert may be referred to as a "RCTA (Rear Cross Traffic Alert)".

In this specification, the "ECU 20" is an electronic control unit with a microcomputer as a main part. The ECU 20 is also referred to as a control unit, a controller and a computer. The microcomputer includes a CPU (processor), a ROM, a RAM, and an interface (I/F), etc. Functions realized by the ECU 20 may be realized by multiple ECUs.

A left rear radar 22 is arranged located at a left end of a rear end of the host vehicle VA in a vehicle width direction and detects an object located in the left rear area of the host vehicle VA. A right rear radar 24 is arranged at a right end of the rear end of the host vehicle VA in the vehicle width direction and detects an object located in the right rear area of the host vehicle VA. If it is not necessary to distinguish between the left rear radar 22 and the right rear radar 24, each of these is referred to as a "radar".

The radar detects the object by receiving reflected waves, which are radio waves transmitted by the radar and reflected by the object. The radar determines whether or not the object is a vehicle based on a reflection intensity of the reflected waves. The radar specifies a position of the object determined as the vehicle relative to the host vehicle VA, and a relative speed Vr of the object relative to the host vehicle VA. The radar transmits radar object information including the position and the relative speed Vr to the ECU 20.

A navigation device 26 has a GNSS (Global Navigation Satellite System) receiver 26*a* and a map data storage unit 24*b*. The GNSS receiver 24*a* receives signals from multiple satellites to specify the current position (latitude and longitude) of the host vehicle VA based on the received signals. Map data is stored in the map data storage unit 24*b*. The map data is data related to a map in which a shape of a lane of a road and a median strip on the road are registered.

A vehicle speed sensor 28 measures a vehicle speed Vs, which represents a speed of the host vehicle VA. A yaw rate sensor 30 measures a yaw rate Yr of the host vehicle VA. The ECU 20 acquires the measured values from these sensors. A shift position sensor 32 detects the current position (a shift position SP) of a shift lever. The shift position SP includes a N range (a neutral position), a P range (a parking position), D range (a forward position) and R range (a reverse position), etc. The ECU 20 acquires a detected value representing the shift position SP from the shift position sensor 32.

A display device 34 displays an alert display element for informing the driver that the approaching vehicle VB is approaching. For example, the display device 34 can be at least one of a meter display, a multimedia display, and a side mirror indicator.

A speaker 36 outputs a buzzer sound for informing the driver that the approaching vehicle VB is approaching.

(Outline of Operation)

Figure 2:
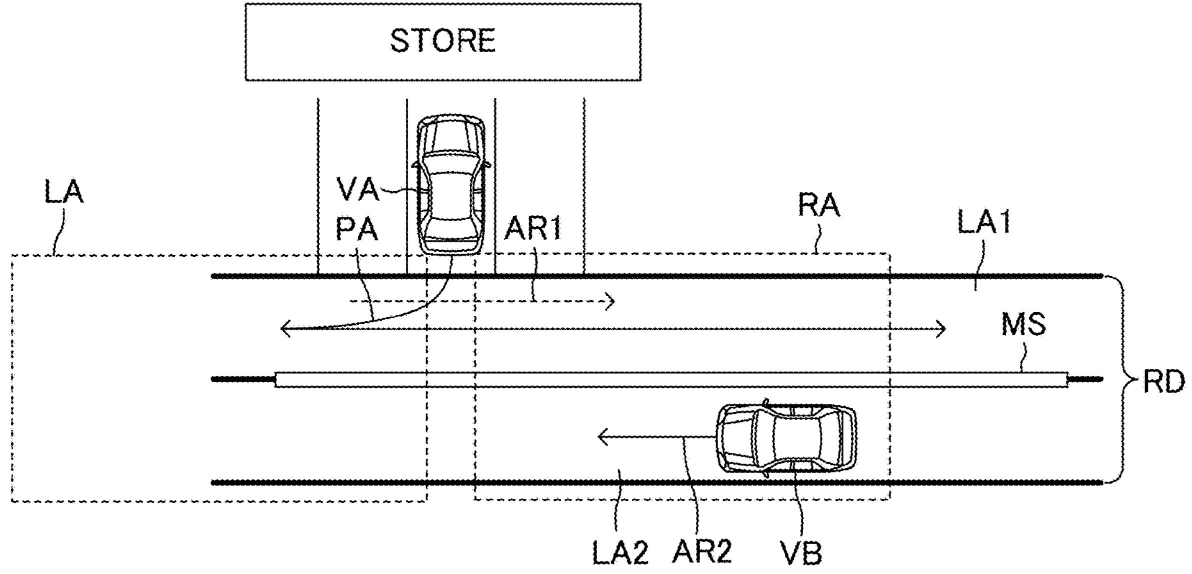
FIG. 2 is a drawing for illustrating an operation example of the driving support apparatus according to the embodiment of the present disclosure.

The ECU 20 determines whether or not there is the approaching vehicle VB which is located in at least one of a left alert area LA and a right alert area RA shown in FIG. 2 and is approaching the host vehicle VA, when the shift position SP is the R range (when the host vehicle VA travels backward). The left alert area LA and the right alert area RA are set in the left rear area and the right rear area of the host vehicle VA, respectively.

When there is the approaching vehicle VB, the ECU 20 refers to the map data stored in the map data storage unit 26*b* to determine whether or not there is a median strip MS (referring to FIG. 2) behind the host vehicle VA (i.e., in a trave direction of the host vehicle VA). If there is the median strip MS behind the host vehicle VA, the ECU 20 determines whether or not there is the median strip MS between the host vehicle VA and the approaching vehicle VB.

When there is the median strip MS between the host vehicle VA and the approaching vehicle VB, a possibility that the approaching vehicle VB gets over the median strip MS to enter an area of the host vehicle VA side is extremely low, and a possibility that the host vehicle VA gets over the median strip MS to enter an area of the approaching vehicle VB side is extremely low. Therefore, a possibility of a collision between the host vehicle VA and the approaching vehicle VB is extremely low. If the alert is performed in this situation, a possibility that the driver is annoyed by the alert is high. Accordingly, if there is the median strip MS between the host vehicle VA and the approaching vehicle VB, the ECU does not perform the alert. On the other hand, if there is no median strip MS between the host vehicle VA and the approaching vehicle VB, the ECU 20 performs the alert because there is the possibility of the collision between the host vehicle VA and the approaching vehicle VB.

The present apparatus 10 can increase the possibility of performing the necessary alert and decrease the possibility of performing unnecessary alert.

Operation Example

FIG. 2 illustrates an example in which the host vehicle VA parked in a parking lot in front of a store travels backward to enter a lane LA1 of an intersecting road RD. In this case, the host vehicle VA travels along a path PA shown in FIG. 2. The intersecting road RD is a road that intersects a travel direction of when the host vehicle VA travels backward.

When the host vehicle VA starts traveling backward, there is the approaching vehicle VB in the right alert area RA of the host vehicle VA. Furthermore, as shown in FIG. 2, there is the median strip MS behind the host vehicle VA, and there is the median strip MS between the host vehicle VA and the approaching vehicle VB (in other words, the approaching vehicle VB is located behind the median strip MS.). Therefore, the ECU 20 does not perform the alert for the approaching vehicle VB.

A phrase that there is the median strip MS between the host vehicle VA and the approaching vehicle VB" can be expressed as a phrase that there is the median strip MS between "the lane LA1 closest to the host vehicle VA (the lane LA1 into which the host vehicle VA enters)" and "a lane LA2 on which the approaching vehicle VB travels" on the intersecting road RD which intersects the travel direction of the host vehicle VA.

(Specific Operation)

Figure 3:
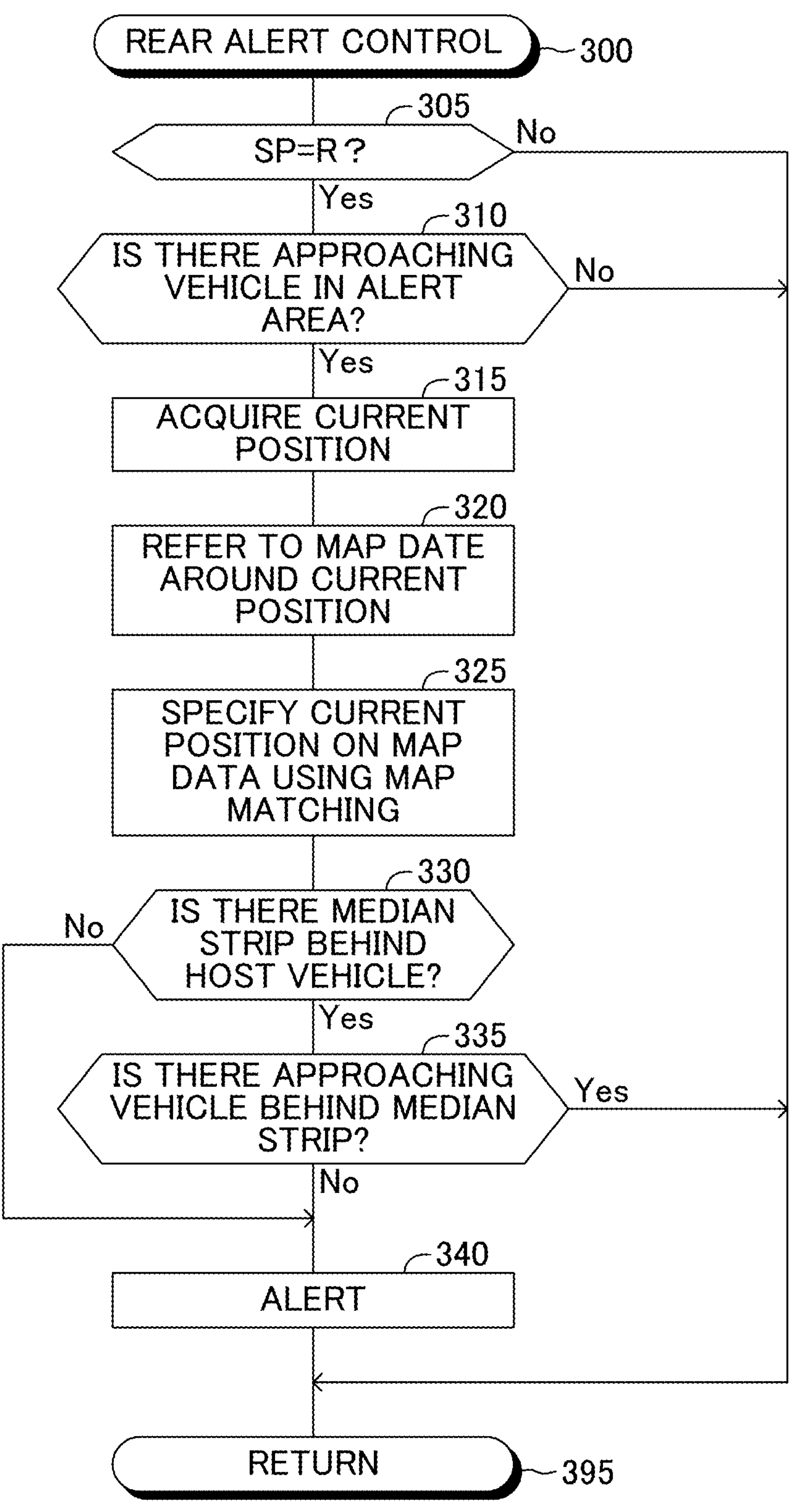
FIG. 3 is a flowchart illustrating a routine executed by a CPU of an ECU shown in FIG. 1.

The CPU of the ECU 20 executes a routine shown by a flowchart in FIG. 3 every time a predetermined time elapses.

<Rear Alert Control Routine>

When an appropriate time point comes, the CPU starts a process from step 300 of FIG. 3, the process proceeds to step 305. At step 305, the CPU determines whether or not the shift position SP is the R range.

When the shift position SP is the R range, the CPU makes a "Yes" determination at step 305, and the process proceeds to step 310. At step 310, the CPU determines whether or not there is the approaching vehicle VB in at least one of the left alert area LA and the right alert area RA.

When there is the approaching vehicle VB in at least one of the left alert area LA and the right alert area RA, the CPU makes a "Yes" determination at step 310 and executes steps 315 through 330.

Step 315: The CPU acquires the current position of the host vehicle VA from the GNSS receiver 26*a*.

Step 320: The CPU acquires the map data within a predetermined range from the current position from the map data storage unit 26*b*.

Step 325: The CPU specifies the current position of the host vehicle VA on the map data using map matching.

In the map matching, the CPU specifies the current position of the host vehicle VA on the map data by comparing a shape of an actual route that the host vehicle VA actually traveled with a shape of the lane of the map data. The actual route may be specified based on the vehicle speed Vs and the yaw rate Yr, or based on a history of the current position of the host vehicle VA.

Step 330: The CPU determines whether or not there is the median strip MS behind the host vehicle VA based on the current position of the host vehicle VA on the map data specified at step 325.

If there is the median strip MS behind the host vehicle VA, the CPU makes a "Yes" determination at step 330 and the process proceeds to step 335. At step 335, the CPU determines whether or not there is the median strip MS between the host vehicle VA and the approaching vehicle VB, in other words, whether or not there is the approaching vehicle VB behind the median strip MS. In detail, the CPU converts the position of the approaching vehicle VB relative to the host vehicle VA specified based on the radar object information into a position on the map data. Thereafter, the CPU determines whether or not there is the median strip MS between the host vehicle VA and the approaching vehicle VB based on the converted position of the approaching vehicle VB.

If there is no median strip MS between the host vehicle VA and the approaching vehicle VB, the CPU makes a "No" determination at step 335 and the process proceeds to step 340. At step 340, the CPU performs the alert. In detail, the CPU displays the alert display element on the display device 34 and makes the speaker 36 output the buzzer sound. Thereafter, the process proceeds to step 395 and the CPU terminates the present routine tentatively.

If there is the median strip MS between the host vehicle VA and the approaching vehicle VB, the CPU makes a "Yes" determination at step 335 and the process proceeds to step 395. At step 395, the CPU terminates the present routine tentatively. As a result, if there is the median strip MS between the host vehicle VA and the approaching vehicle VB, no alert is performed.

On the other hand, if there is no median strip MS behind the host vehicle VA when the process proceeds to step 330, the CPU makes a "No" determination at step 330 and the process proceeds to step 340. As a result, if there is no median strip MS behind the host vehicle VA, the alert is performed.

If the shift position SP is not in the R range ("No" at step 305) or there is no approaching vehicle VB in either the left alert area LA or the right warning area RA ("No" at step 310), the process proceeds to step 395 and the CPU terminates the present routine tentatively.

First Modification Example

In the above embodiment, the CPU determines whether or not there is the median strip MS between the host vehicle VA and the approaching vehicle VB based on the radar object information (referring to step 335). Therefore, an accuracy of the determination at step 335 depends on a positioning accuracy of the radar. In the present modification example, the CPU determines whether or not there is the median strip MS between the host vehicle VA and the approaching vehicle VB based on an approaching direction of the approaching vehicle VB.

As shown in FIG. 2, in a left-hand traffic country/region, "a vehicle located on the lane LA1 closest to the host vehicle VA on the intersecting road RD" travels in a direction from right to left relative to the travel direction of the host vehicle VA1 (in a direction of a dotted arrow AR1 shown in FIG. 2). If there is the approaching vehicle VB between the lane LA1 and the lane LA2, a vehicle located on the lane LA2 travels in the opposite direction to the travel direction in the lane LA1 (in a direction from left to right relative to the travel direction of the host vehicle VA1). The travel direction in the lane LA2 is a direction of an arrow AR2 shown in FIG. 2. Therefore, in the left-hand traffic country/region, if the approaching direction of the approaching vehicle VB is the direction from left to right relative to the travel direction of the host vehicle VA (hereinafter, referred to as a "suppression direction"), it can be determined that there is the median strip MS between the host vehicle VA and the approaching vehicle VB.

In the present modification example, if there is the median strip MS behind the host vehicle VA, the ECU 20 determines whether or not the approaching direction of the approaching vehicle VB is the suppression direction. If the approaching direction of the approaching vehicle VB is the suppression direction, the ECU 20 determines that there is the median strip MS between the host vehicle VA and the approaching vehicle VB and does not perform the alert.

Figure 4:
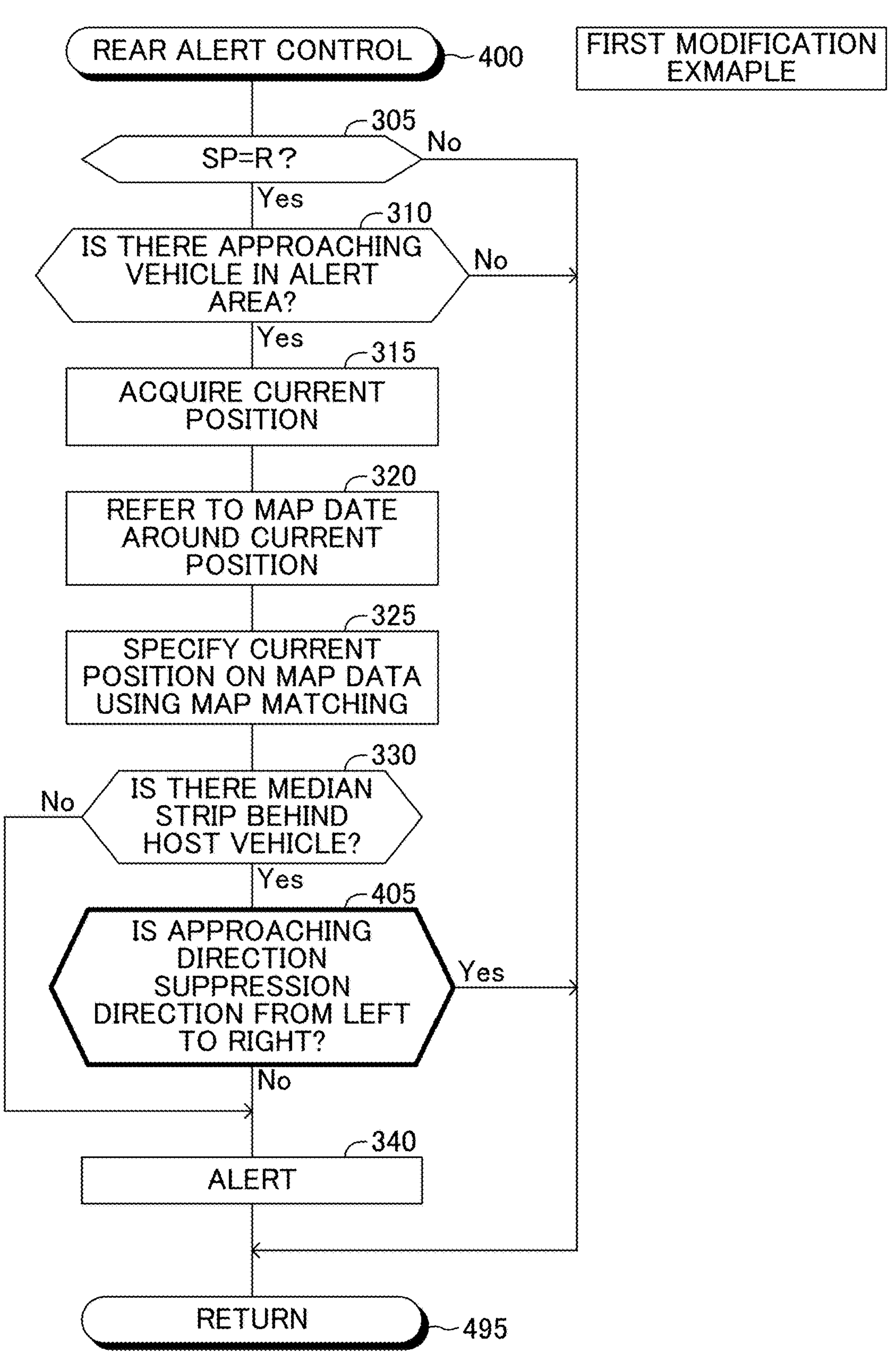
FIG. 4 is a flowchart illustrating a routine executed by a CPU of an ECU according to a first modification example of the embodiment of the present disclosure.

The CPU of the ECU 20 according to the present modification example executes a rear alert control routine shown in FIG. 4 instead of the rear alert control routine shown in FIG. 3. In FIG. 4, the same reference numerals are given to the same processes as those shown in FIG. 3, and descriptions of the processes are omitted.

When an appropriate time point comes, the CPU starts a process from step 400 of FIG. 4. If the shift position SP is the R range ("Yes" at step 305 shown in FIG. 4) and there is the approaching vehicle VB in at least one of the left alert area LA and the right alert area RA ("Yes" at step 310 shown in FIG. 4), the CPU executes steps 315 through 330 shown in FIG. 4.

If there is the approaching vehicle VB behind the host vehicle VA ("Yes" at step 330 shown in FIG. 4), the process proceeds to step 405. At step 405, the CPU determines whether or not the approaching direction of the approaching vehicle VB is the suppression direction from left to right relative to the travel direction of the host vehicle VA.

If the approaching direction is not the suppression direction, the CPU makes a "No" determination at step 405 and the process proceeds to step 340 shown in FIG. 4. As a result, the alert is performed. On the other hand, if the approaching direction is the suppression direction, the CPU makes a "Yes" determination at step 405, and the process proceeds to step 495 and the CPU terminates the present routine tentatively. As a result, no alert is performed.

As a result of the above, the accuracy of the determination as to whether or not there is the median strip MS between the host vehicle VA and the approaching vehicle VB is no longer dependent on the positioning accuracy of the radar, and the accuracy of the determination can be improved.

In a right-hand traffic country/region, the suppression direction is preset to a direction from right to left relative to the travel direction of the host vehicle VA.

Second Modification Example

In the above embodiment, the position of the host vehicle VA on the map data is specified using the map matching. However, immediately after an ignition of the host vehicle VA is turned from an off state an on state (immediately after the ignition is turned on), a possibility that the position of the host vehicle VA on the map data cannot be specified using the map matching is high. This is because, immediately after the ignition is turned on, the actual route is not acquired, and therefore, the shape of the actual route cannot be compared with the shape of the lane in the map data.

Therefore, the ECU 20 according to the present modification example continues to determine whether or not there is the median strip MS behind the host vehicle VA after "a travel distance of the host vehicle VA from an ignition time at which the ignition is turned on" becomes equal to or longer than a predetermined distance. When the ignition is turned from the on state to the off state, the ECU 20 stores a result of the above determination as to whether or not there is the median strip MS behind the host vehicle VA in a non-volatile storage area.

During an initial time period from the ignition time to a time at which the travel distance becomes equal to or longer than the predetermined distance, the ECU 20 cannot perform the map matching. Therefore, during the initial time period, the ECU 20 determines whether or not there is the median strip MS behind the host vehicle VA based on the result of the above determination which is stored when the ignition is turned off. Therefore, even during the initial time period, the ECU 20 can accurately determine whether or not there is the median strip MS behind the host vehicle VA.

Figure 5:
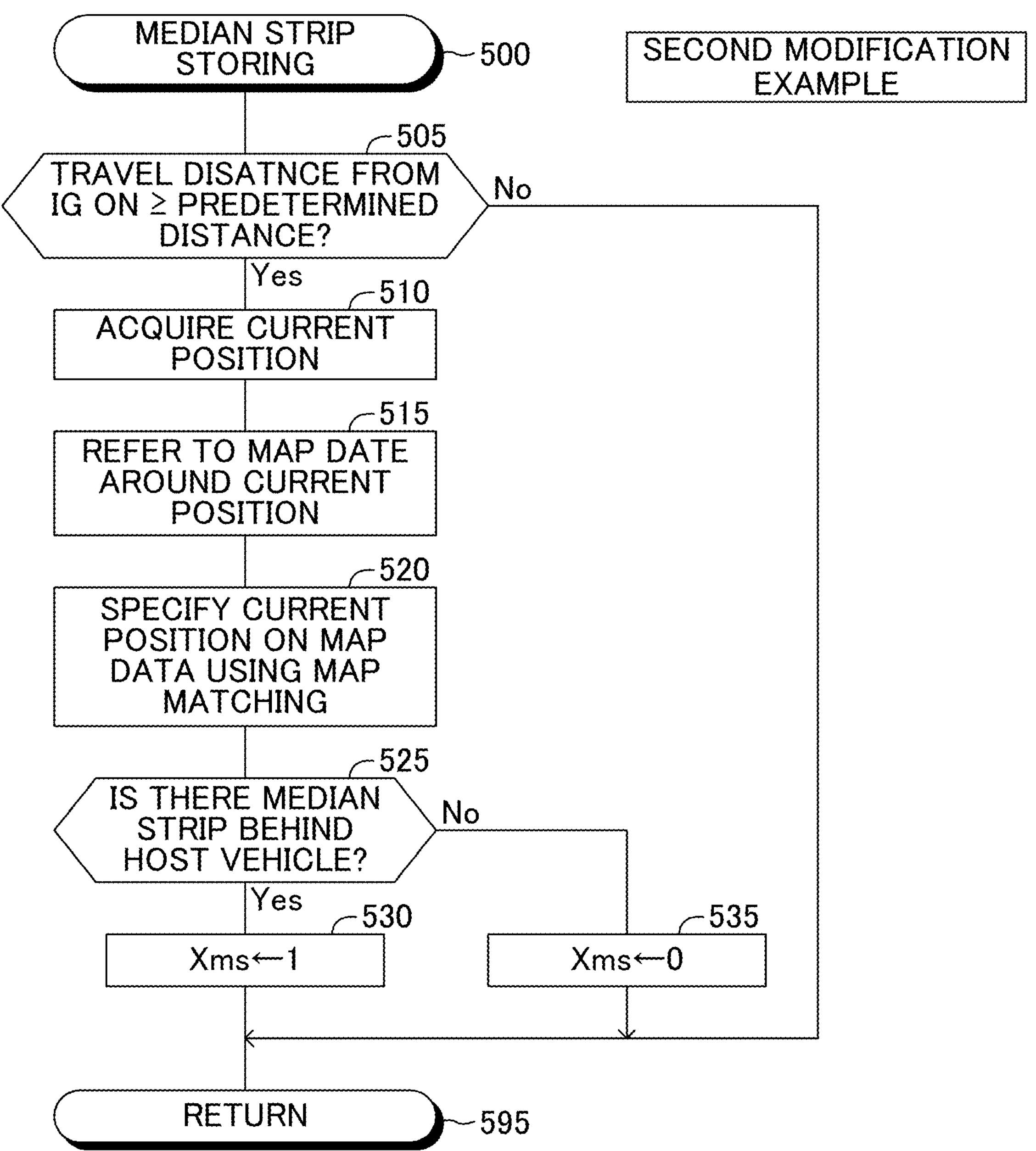
FIG. 5 is a flowchart illustrating a routine executed by a CPU of an ECU according to a second modification example of the embodiment of the present disclosure.
Figure 6:
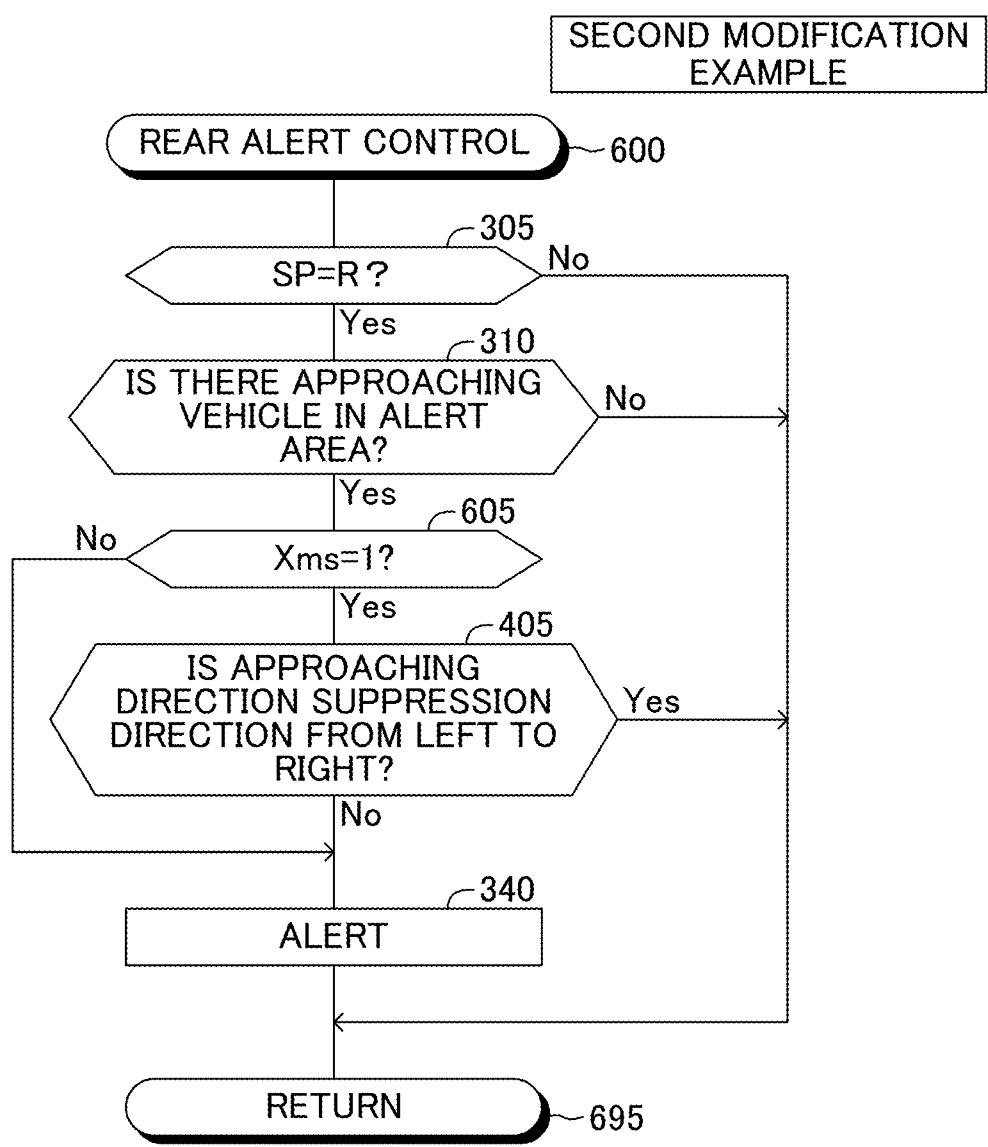
FIG. 6 is a flowchart illustrating a routine executed by the CPU of the ECU according to the second modification example of the embodiment of the present disclosure.

The CPU of the ECU 20 according to the present modification example executes a routine shown in FIG. 5 every time a predetermined time elapses, and executes a rear alert control routine shown in FIG. 6 instead of the rear alert control routine shown in FIG. 3. In FIG. 6, the same reference numerals are given to the same processes as those shown in FIGS. 3 and 4, and descriptions of the processes are omitted.

The driving support apparatus 10 according to the present modification example comprises a storage device 38 shown in FIG. 1. The storage device 38 has the non-volatile storage area, and a median strip zone flag storage unit 38*a* is set in the non-volatile storage area. A median strip flag Xms described below is stored in the median strip zone flag storage unit 38*a*.

<Median Strip Storing Routine>.

When an appropriate time point comes, the CPU starts the process from step 500 in FIG. 5 and the process proceeds to step 505. At step 505, the CPU determines whether or not the travel distance of the host vehicle VA from the time at which the ignition is turned on is equal to or longer than the predetermined distance.

If the travel distance is shorter than the predetermined distance, the CPU makes a "No" determination at step 505. In this case, the process proceeds to step 595 and the CPU terminates the present routine tentatively.

If the travel distance is equal to or longer than the predetermined distance, the CPU makes "Yes" determination at step 505 and executes steps 510 through 525. Steps 510 through 525 are the same as steps 315 through 330, respectively, so the descriptions thereof will be omitted.

If there is the median strip MS behind the host vehicle VA, the CPU makes a "Yes" determination at step 525 and the process proceeds to step 530. At step 530, the CPU sets a value of the median strip flag Xms to "1". Thereafter, the process proceeds to step 595 and the CPU terminates the present routine tentatively.

On the other hand, if there is no median strip MS behind the host vehicle VA, the CPU makes a "No" determination at step 525 and the process proceeds to step 535. At step 535, the CPU sets the value of the median strip flag Xms to "0". Thereafter, the process proceeds to step 595 and the CPU terminates the present routine tentatively.

When the ignition is turned off, the CPU stores the value of the median strip flag Xms at a time at which the ignition is turned off in the median strip flag storage unit 38*a*.

<Rear Alert Control Routine>

When an appropriate time point comes, the CPU starts the process from step 600 in FIG. 6. If the shift position SP is the R range ("Yes" at step 305 shown in FIG. 6) and there is the approaching vehicle VB in at least one of the left alert area LA and the right alert area RA ("Yes" at step 310 shown in FIG. 6), the process proceeds to step 605.

At step 605, the CPU determines whether or not the value of the median strip flag Xms is "1".

In detail, if the travel distance from the time at which the ignition is turned on is shorter than the predetermined distance, the CPU determines whether or not the value of the median strip flag Xms stored in the median strip flag storage unit 38*a* is "1". If the travel distance from the time at which the ignition is turned on is equal to longer than the predetermined distance, the CPU determines whether or not the value of the median strip flag Xms set in the median strip routine executed immediately before is "1".

If the value of the median strip flag Xms is "1", the CPU makes a "Yes" determination at step 605 and the process proceeds to step 405 shown in FIG. 6. If the approaching direction is not the suppression direction ("No" at step 405 shown in FIG. 6), the process proceeds to step 340 shown in FIG. 6, and the CPU performs the alert. Thereafter, the process proceeds to step 695 and the CPU terminates the present routine tentatively. If the approaching direction is the suppression direction ("Yes" at step 405 shown in FIG. 6), the process proceeds to step 695 and the CPU terminates the present routine tentatively.

If the value of the median strip flag Xms is "0", the CPU makes a "No" determination at step 605 and the process proceeds to step 340 shown in FIG. 6.

If the travel distance of the host vehicle VA from the time at which the ignition is turned on is equal to or longer than the predetermined distance when the process proceeds to step 405 shown in FIG. 6, the CPU may execute step 335 shown in FIG. 3 instead of step 405 shown in FIG. 6. This is because the CPU can perform the map matching so that the CPU can specify the current position of the host vehicle VA and the current position of the approaching vehicle VB on the map data using the map matching, when the travel distance is equal to or longer than the predetermined distance.

Third Modification Example

The ECU 20 according to the present modification example may perform the alert when the shift position SP is any one of the D and N ranges (i.e., when the host vehicle VA travels forward). In detail, the ECU 20 may perform the alert when there is the "approaching vehicle VB that is located in at least one of a left alert area set in a left front area of the host vehicle VA and the right alert area set in a right front area of the host vehicle VA and that is approaching the host vehicle VA". The driving support apparatus 10 according to the present modification example comprises a left front radar that detects an object located in the left front area of the host vehicle VA and a right front radar that detects an object located in the right front area of the host vehicle VA.

If there is the above approaching vehicle VB, the ECU 20 does not perform the alert when there is the median strip MS "in front of" (i.e., in the travel direction) of the host vehicle VA and the median strip MS is between the host vehicle VA and the approaching vehicle VB.

The present modification example can be applied to the first and second modification examples. When the present modification example is applied to the second modification example, in the median strip storing routine, the ECU 20 sets the value of a front median strip flag Xms' in addition to the median strip flag Xms. In detail, the ECU 20 sets the value of the forward median strip flag Xms' to "1" when there is the median strip MS in front of the host vehicle VA (that is, when there is the median strip MS in the travel direction of the host vehicle VA), and sets the value of the front median strip flag Xms' to "0" when there is no median strip MS in front of the host vehicle VA. When the ignition is turned off, the ECU 20 stores the value of the front median strip flag Xms' in the median strip storage unit 38*a*.

When the shift position SP is either the D or N range and there is the approaching vehicle VB in at least one of the left alert area set in the left front area of the host vehicle VA and the right alert area set in the right front area of the host vehicle VA, the ECU 20 determines whether or not the value of the front median strip flag Xms' is "1". If the value of the front median strip flag Xms' is "1", the ECU 20 does not perform the alert when there is the median strip MS between the host vehicle VA and the approaching vehicle VB, and the ECU 20 performs the alert when there is no median strip MS between the host vehicle VA and the approaching vehicle VB.

In the above embodiment, the ECU 20 performs the alert by executing a display control for displaying the alert display element on the display device 34 and a sound control for making the speaker 36 output the buzzer sound. The alert may also be performed by executing at least one of the display control and the sound control. The present apparatus 10 may further comprise a camera. The present apparatus 10 determines whether or not the object is a vehicle based on an image captured by the camera.

The present apparatus 10 may be applied to (or installed in/on) an engine vehicle, a hybrid electric vehicle (HEV), a plug-in hybrid electric vehicle (PHEV), a fuel cell electric vehicle (FCEV), and a battery electric vehicle (BEV). Furthermore, the present disclosure can be regarded as a non-transitory storage medium in which a program for realizing the functions of the present apparatus 10 is stored and which is readable by a computer.

What is claimed is:

1. A driving support system comprising a controller configured to perform an alert to a driver of a host vehicle when there is an approaching vehicle that is located in an alert area set in a front side area or a rear side area of the host vehicle and is approaching the host vehicle, wherein, the controller configured to:

determine whether or not there is a median strip between the host vehicle and the approaching vehicle, when there is the approaching vehicle; and perform no alert when there is the median strip between the host vehicle and the approaching vehicle, and during an initial time period from a start time at which an ignition of the host vehicle is changed from an off state to an on state to a time at which a travel distance from the start time is equal to or longer than a predetermined distance, determine whether or not there is the median strip between the host vehicle and the approaching vehicle, based on a prior determination that the median strip was present in the travel direction of the host vehicle before the ignition was changed to the off state.

2. The driving support system according to claim 1, wherein, the controller is configured to:

determine whether or not there is the median strip in a travel direction of the host vehicle by referring to map data, when there is the approaching vehicle;

determine that there is the median strip between the host vehicle and the approaching vehicle so as to perform no alert, when there is the median strip in the travel direction and an approaching direction of the approaching vehicle is a suppression direction which is a predetermined direction relative to the travel direction depending on a left-hand traffic or a right-hand traffic.

3. The driving support system according to claim 2, wherein, the suppression direction is predetermined to a direction from left to right relative to the travel direction in a left-hand traffic country or region, or to a direction from right to left relative to the travel direction in a right-hand traffic country or region.

4. The driving support system according to claim 3, wherein, the map data in which a position of the median strip and a shape of a road is registered is stored in the driving support system, and the controller is configured to:

specify a position of the host vehicle on the map data by comparing a shape of an actual route that the host vehicle actually traveled with the shape of the road;

refer to the map data to determine whether or not there is the median strip in front of the host vehicle or behind the host vehicle based on the position of the host vehicle on the map data;

store a result of a determination as to whether or not there is the median strip, when the ignition of the host vehicle is changed from the on state to the off state;

during the initial time period, determine whether or not there is the median strip in the travel direction of the host vehicle based on the result of the determination;

determine that there is the median strip between the host vehicle and the approaching vehicle, when there is the median strip in the travel direction of the host vehicle and an approaching direction of the approaching vehicle is a suppression direction which is a predetermined direction relative to the travel direction depending on a left-hand traffic or a right-hand traffic.

* * * * *